United States Patent
Oversby (10) Patent No.: US 10,598,133 B2
(45) Date of Patent: Mar. 24, 2020

(54) GASEOUS FUEL VENT HANDLING APPARATUS AND METHOD

(71) Applicant: WESTPORT POWER INC., Vancouver (CA)

(72) Inventor: Kevin Kwame Oversby, Vancouver (CA)

(73) Assignee: WESTPORT POWER INC., Vancouver (CA)

(*) Notice: Subject to any disclaimer, the term of this patent is extended or adjusted under 35 U.S.C. 154(b) by 180 days.

(21) Appl. No.: 15/521,244

(22) PCT Filed: Oct. 23, 2015

(86) PCT No.: PCT/CA2015/051082
§ 371 (c)(1),
(2) Date: Apr. 21, 2017

(87) PCT Pub. No.: WO2016/061698
PCT Pub. Date: Apr. 28, 2016

(65) Prior Publication Data
US 2017/0314513 A1 Nov. 2, 2017

(30) Foreign Application Priority Data
Oct. 23, 2014 (CA) .................................. 2868338

(51) Int. Cl.
*F02M 25/08* (2006.01)
*F02D 41/00* (2006.01)
(Continued)

(52) U.S. Cl.
CPC ..... *F02M 25/0836* (2013.01); *F02D 41/0025* (2013.01); *F02D 41/0027* (2013.01);
(Continued)

(58) Field of Classification Search
CPC .......... F02M 25/0836; F02M 21/0224; F02M 21/0242; F02M 25/0854; F02M 25/089;
(Continued)

(56) References Cited

U.S. PATENT DOCUMENTS 5,245,974 A * 9/1993 Watson ................. F02M 69/08
123/518
6,298,833 B1 10/2001 Douville et al.
(Continued)

FOREIGN PATENT DOCUMENTS

| | | |
|---|---|---|
| CA | 2 831 762 A1 | 1/2014 |
| EP | 0 745 499 A2 | 12/1996 |
| WO | 2012/072184 A1 | 6/2012 |

OTHER PUBLICATIONS

International Search Report and Written Opinion, dated Feb. 8, 2016, for International Application No. PCT/CA2015/051082, 8 pages.

*Primary Examiner* — Joseph J Dallo
*Assistant Examiner* — Yi-Kai Wang
(74) *Attorney, Agent, or Firm* — Seed IP Law Group LLP (57) ABSTRACT

Venting of gaseous fuel during operation and after shutdown of an internal combustion engine increases emissions. A vent handling apparatus for a gaseous fuel system of an internal combustion engine comprises an accumulator for storing gaseous fuel; a first valve selectively enabling fluid communication between the accumulator and one of a gaseous fuel communication passage and a gaseous fuel storage vessel, the gaseous fuel communication passage delivering gaseous fuel to the internal combustion engine for combustion; and an apparatus for selectively returning the gaseous fuel from the accumulator to the internal combustion engine for combustion.

22 Claims, 6 Drawing Sheets

(51) Int. Cl.
*F02M 43/00* (2006.01)
*F02M 21/02* (2006.01)
*F02D 41/04* (2006.01)
*F15B 1/027* (2006.01)

(52) U.S. Cl.
CPC ....... *F02D 41/042* (2013.01); *F02M 21/0224* (2013.01); *F02M 21/0242* (2013.01); *F02M 25/089* (2013.01); *F02M 25/0854* (2013.01); *F02M 43/00* (2013.01); *F15B 1/027* (2013.01); *F15B 2201/31* (2013.01); *F15B 2201/405* (2013.01); *F15B 2201/41* (2013.01); *F15B 2201/4155* (2013.01); *Y02T 10/32* (2013.01)

(58) Field of Classification Search
CPC . F02M 43/00; F02D 41/0025; F02D 41/0027; F02D 41/042; F15B 1/027; F15B 2201/31; F15B 2201/405; F15B 2201/41; F15B 2201/4155; Y02T 10/32
USPC ........................................................ 123/520
See application file for complete search history.

(56) References Cited

U.S. PATENT DOCUMENTS

| | | | |
|---|---|---|---|
| 6,336,598 B1 | 1/2002 | Touchette et al. | |
| 2002/0117156 A1* | 8/2002 | Ricco | F02M 21/0242 123/527 |
| 2006/0213488 A1* | 9/2006 | Post | F02M 55/005 123/527 |
| 2007/0125338 A1* | 6/2007 | Kato | F02D 19/0605 123/304 |
| 2013/0037113 A1* | 2/2013 | Otanez | F15B 1/027 137/1 |
| 2014/0116375 A1 | 5/2014 | Kim et al. | |
| 2014/0290972 A1* | 10/2014 | Robson | E02D 7/10 173/1 |
| 2014/0299101 A1* | 10/2014 | Melanson | F17C 5/06 123/445 |
| 2015/0233310 A1* | 8/2015 | Zhang | F02D 19/06 701/54 |
| 2015/0253045 A1* | 9/2015 | Yamada | F25B 5/04 62/324.1 |
| 2017/0198725 A1* | 7/2017 | Weber | F15B 1/08 |

* cited by examiner

GASEOUS FUEL VENT HANDLING APPARATUS AND METHOD

FIELD OF THE INVENTION

The present application relates to techniques for reducing venting of gaseous fuel to atmosphere for internal combustion engines, and more particularly for capturing vented gaseous fuel and reintroducing it for combustion in the engine.

BACKGROUND OF THE INVENTION

Gaseous fuelling systems have a unique phenomenon associated with them called venting. Liquid fuelling systems have a related but different phenomenon called evaporative emissions, but venting does not occur in liquid fuel systems. Venting can occur for a variety of reasons. A pressure relief valve for a cryogenic storage vessel storing a liquefied gaseous fuel can be activated when vapor pressure within the vessel rises above a safety limit. In applications that employ a pressure regulating apparatus to maintain a pressure bias between a liquid fuel and a gaseous fuel, the apparatus can vent gaseous fuel when liquid fuel pressure changes rapidly.

Double-walled, vacuum insulated cryogenic storage vessels store liquefied gaseous fuel at cryogenic temperatures at low pressures. For example, when liquefied gaseous fuel is first added to the storage vessel it can be at or around atmospheric pressure and the temperature remains in equilibrium around the boiling point. However, since the storage vessel cannot reduce heat leak into the vessel completely, especially when a cryogenic pump is partially installed in the vessel, the liquefied gaseous fuel begins to boil, increasing the vapor pressure. A pressure relief valve in the vessel is employed to prevent excessive pressure build-up by venting gaseous fuel vapor. Since these cryogenic storage vessels are not specifically designed as pressurized storage vessels, the pressure at which these vessels vent can be relatively low, for example, around 500 pounds per square inch (psi).

In applications that employ concentric needle fuel injectors to introduce a gaseous fuel separately and independently from a liquid fuel, such as in the Applicant's co-owned U.S. Pat. No. 6,336,598, gaseous fuel pressure is maintained within a predetermined margin of liquid fuel pressure. Liquid fuel is employed not only as a pilot fuel but also as a hydraulic fluid and a fluid seal within the fuel injector. If gaseous fuel pressure rises above liquid fuel pressure (or if the pressure differential is below a predetermined level) then gaseous fuel leaks into the liquid fuel, and if gaseous fuel pressure drops too far below liquid fuel pressure, liquid fuel leaks excessively into the nozzle of the fuel injector and later gets burned in the combustion chamber. One way to regulate gaseous fuel pressure based on liquid fuel pressure is with a dome loaded regulating valve that employs the difference between liquid fuel pressure and upstream gaseous fuel pressure to modulate a valve such that downstream gaseous fuel pressure is maintained with the predetermined margin of the liquid fuel pressure. In these types of device, when the liquid-gaseous fuel pressure differential drops below the predetermined level, gaseous fuel is vented from the device such that the downstream gaseous fuel pressure can follow the rate of change of liquid fuel pressure thereby maintaining the pressure bias between the two fuels.

In addition to venting, gaseous fuelling systems have unique sealing challenges compared to liquid fuelling systems. Gaseous fuels have higher enthalpy since they are in a gas state compared to liquid fuels and so can penetrate through tighter spaces and further into solids. The dimensional tolerances between gaseous fuelling system components are smaller to reduce, and preferably prevent, the leakage of gaseous fuel. Seals employed between components should have a lower permeability than that required for seals used in liquid fuelling systems, and must be able to withstand harsh environments such as rapid decompression. Leakage of gaseous fuels after engine shutdown has been a particularly challenging sealing problem. After engine shutdown, gaseous fuel pressure remains high causing gaseous fuel to leak through fuel injectors.

During shutdown, liquid fuels can be depressurized by returning the fuel to the storage tank. Although not all the liquid fuel in fuelling conduits can be drained, by returning liquid fuel to atmospheric pressure the likelihood of leaks is substantially reduced. This is not possible in gaseous fuelling systems. For example, when gaseous fuel is stored as a gas in a pressurized storage vessel it is stored at a substantially higher pressure than the pressure required by the fuel injection system. The pressure of the gaseous fuel is reduced and regulated to the fuel injection pressure, and during shutdown cannot be returned to the storage vessel unless it is pumped by a compressor which is not economically feasible or efficient. When gaseous fuel is stored in liquefied form it is stored at cryogenic temperatures. As the engine demands fuel from the fuelling system, a cryogenic pump pressurizes and delivers the liquefied fuel from the cryogenic storage vessel to a vaporizer where it is converted to a gas, which is then supplied to fuel injectors for introduction into engine cylinders. During shutdown, if the vaporized gaseous fuel was returned to the cryogenic storage vessel it would add a considerable amount of heat to the vessel, causing the liquefied fuel to boil at a greater rate raising the pressure within the vessel leading to venting. As a result, after shutdown gaseous fuel remains in fuelling conduits and fuel injectors, and depending upon the fuel injection pressure the pressure of the gaseous fuel can be around one, two, or more, orders of magnitude above atmospheric pressure. The pressure differential between gaseous fuel pressure and atmospheric pressure after shutdown causes gaseous fuel to leak past injection valves in fuel injectors into engine cylinders, which can then eventually leak to atmosphere or result in unburned hydrocarbon emissions when the engine is started up again.

European Patent Specification No. EP 0 745 499, published on Jul. 11, 2001 to Michael Ernest Garrett, discloses a supplementary storage vessel fluidly connected with a vent pipe for receiving at least a portion of vented boil-off gas from a storage tank storing liquefied gaseous fuel. The supplementary storage vessel is filled with an adsorbent such as a high surface area activated carbon or zeolite sieve which has the ability to store a large volume of vented boil-off gas by adsorption. An auxiliary supply pipe is fluidly connected with the supplementary storage vessel for delivering the vented boil-off gas to an engine supply pipe.

International Patent Publication No. WO2012072184, published for Klaus Rossler on Jun. 7, 2012, discloses an arrangement for a combustion engine operated with gaseous fuel, where a supplementary storage unit is provided for receiving gaseous fuel from a fuel introducing device (e.g. a fuel rail for a direct injection system) during shutdown, such that leakage of gaseous fuel is avoided. A solenoid valve is employed to introduce the gaseous fuel into the intake manifold downstream of the throttle and compressor unit from a supercharger.

A problem with the techniques of the '499 and '184 references is that the gaseous fuel introduced from the supplementary storage tank/unit into the intake manifold does not burn well in the engine and substantially results in unburned hydrocarbon emissions. Further, these references do not address the challenge of dynamic venting where gaseous fuel is vented from the rail, either purposively or through leakage during operation of the engine.

The state of the art is lacking in techniques for reducing vented emissions from gaseous fuelled internal combustion engines. The present apparatus and method provides a technique for improving the handling of vented gaseous fuel from internal combustion engines.

SUMMARY OF THE INVENTION

An improved vent handling apparatus for a gaseous fuel system of an internal combustion engine comprising an accumulator for storing gaseous fuel; a first valve selectively enabling fluid communication between the accumulator and one of a gaseous fuel communication passage and a gaseous fuel storage vessel, the gaseous fuel communication passage delivering gaseous fuel to the internal combustion engine for combustion; and an apparatus for selectively returning the gaseous fuel from the accumulator to the internal combustion engine for combustion.

The apparatus for selectively returning the gaseous fuel can comprise a second valve enabling fluid communication between the accumulator and the gaseous fuel communication passage when gaseous fuel pressure in the gaseous fuel communication passage is less than gaseous fuel pressure in the accumulator by a predetermined margin. Alternatively, the apparatus can employ a source of pressurized liquid fuel to return the gaseous fuel. For example, the accumulator can comprise a cylinder and a piston reciprocating therein. The gaseous fuel communication passage is fluidly connected with the cylinder through a first port on a first side of the piston and the source of pressurized liquid fuel fluidly connected with the cylinder through a second port on a second side of the piston. The pressurized liquid fuel acts on the piston to return the gaseous fuel in the accumulator to the gaseous fuel communication passage through the first valve. In yet another alternative, the apparatus can comprise a third valve fluidly connecting the accumulator with an intake air passage for selectively enabling fluid communication from the accumulator to the intake air passage upstream of a compressor.

In a preferred embodiment, the vent handling apparatus comprises a pressure regulating apparatus for regulating a pressure bias between a liquid fuel and the gaseous fuel. The first valve opens when the pressure bias drops below a predetermined level. In another preferred embodiment the second valve is a check valve. The check valve can comprise a spring bias urging the check valve closed. Alternatively, the second valve can be a solenoid valve. The piston can comprise a spring bias urging the piston towards the second port. In a preferred embodiment, a bellows can fluidly seal the piston with the cylinder.

In preferred embodiments there is an electronic controller operatively connected with the first valve and programmed to close the first valve after a predetermined time period after engine shut down. Alternatively, the electronic controller can close the first valve when gaseous fuel pressure in the gaseous fuel communication passage drops below a predetermined level. The electronic controller is further programmed to open the first valve after the internal combustion engine starts up again. The electronic controller is operatively connected with the third valve and programmed to open the third valve after the internal combustion engine starts up again. The third valve can be opened when the internal combustion engine is operating with boost in an air induction system.

An improved method of handling gaseous fuel vented from a gaseous fuel system for an internal combustion engine comprises capturing the gaseous fuel vented from at least one of a gaseous fuel communication passage and a gaseous fuel storage vessel in an accumulator; and reintroducing the gaseous fuel for combustion. In a preferred embodiment, the gaseous fuel can be reintroduced from the accumulator into the gaseous fuel communication passage when gaseous fuel pressure therein drops below gaseous fuel pressure in the accumulator. In another preferred embodiment, the gaseous fuel can be reintroduced from the accumulator into the gaseous fuel communication passage by pressurizing the gaseous fuel with a liquid fuel. In yet another preferred embodiment, the gaseous fuel can be reintroduced from the accumulator into an air induction system of the internal combustion engine upstream of a compressor.

In a preferred embodiment, gaseous fuel pressure in the gaseous fuel communication passage is regulated based on liquid fuel pressure. Gaseous fuel is vented when liquid fuel pressure drops below gaseous fuel pressure. When gaseous fuel is reintroduced into the air induction system, it is preferred that a non-ignitable gaseous fuel and air mixture is formed therein, and preferably the gaseous fuel is introduced into the air induction system during high load operation of the internal combustion engine.

DETAILED DESCRIPTION OF PREFERRED EMBODIMENT(S)

Figure 1:
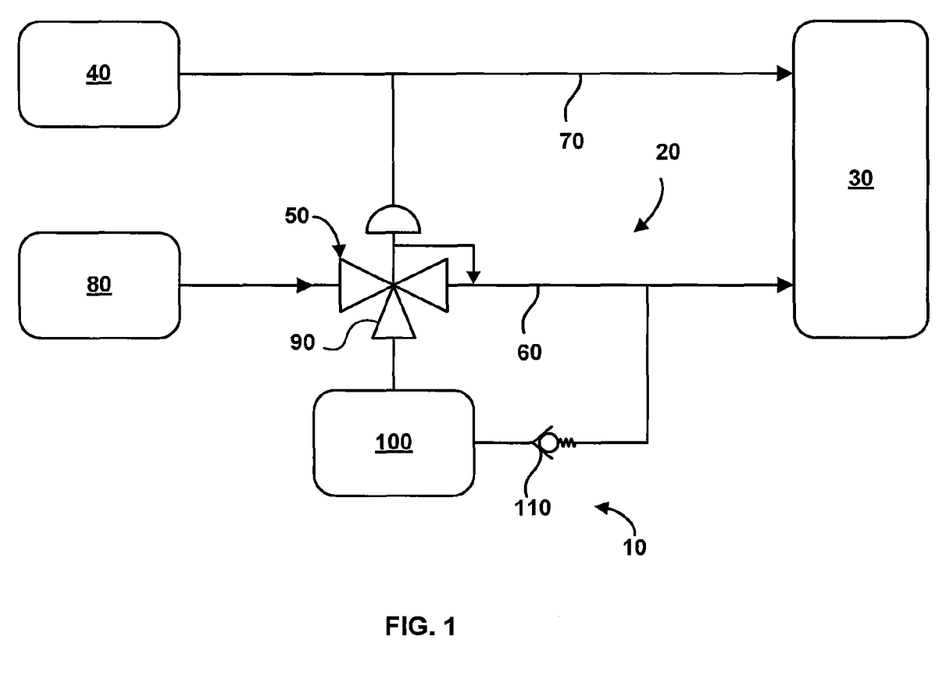
FIG. 1 is a schematic view of a vent handling apparatus for a gaseous fuel system of an internal combustion engine fuelled with a gaseous fuel and a liquid fuel according to a first embodiment.

Referring to FIG. 1, vent handling apparatus 10 is shown for capturing gaseous fuel vented from gaseous fuel system 20, and returning thereto. Internal combustion engine 30 is fuelled with gaseous fuel from system 20 and liquid fuel from liquid fuel supply 40. In the illustrated embodiment the gaseous fuel is the main fuel and the liquid fuel acts as a pilot fuel for igniting the gaseous fuel.

In a preferred embodiment the gaseous and liquid fuel are introduced separately and independently into cylinders of engine 30 by concentric needle fuel injectors (not shown), such as disclosed in U.S. Pat. No. 6,336,598. These types of concentric needle fuel injectors operate with a pressure bias between the gaseous and liquid fuels where liquid fuel pressure is greater than gaseous fuel pressure. Pressure regulating apparatus 50 regulates the pressure of gaseous fuel in conduit 60 as a function of liquid fuel pressure in conduit 70 such that the pressure bias is achieved. As used herein conduit 60 is a gaseous fuel communication passage. Gaseous fuel supply 80 delivers pressurized gaseous fuel above liquid fuel pressure in conduit 70 to pressure regulating apparatus 50, and liquid fuel supply 40 delivers pressurized liquid fuel to conduit 70. The operation of pressure regulating apparatus 50 is described in more detail in U.S. Pat. No. 6,298,833.

In the illustrated embodiment, pressure regulating apparatus 50 introduces venting valve 90 that vents gaseous fuel when the pressure bias drops below a predetermined level such that the pressure bias is maintained within predetermined margins. In the illustrated embodiment venting valve 90 is a pressure driven valve that opens based on the relative liquid and gaseous fuel pressures. In other embodiments valve 90 can be an electromechanical valve, such as a solenoid valve, that is electronically controlled.

There are a number of causative factors that may cause the pressure bias to decrease below the predetermined level resulting in a negative pressure bias. For instance, as engine 30 transitions to different regions of the engine operating map, the demanded operating pressure of the gaseous fuel can change. Liquid fuel pressure is adjusted in order to achieve the demanded gaseous fuel pressure by way of pressure regulating apparatus 50. Since liquid fuel is an incompressible fluid, its pressure can change much more quickly than that of the gaseous fuel, which is a compressible fluid. In certain operating conditions, this can result in the liquid fuel pressure dropping below gaseous fuel pressure creating a negative pressure bias. Another cause of the negative pressure bias can be pressure ripples in conduit 70 that may be caused by fuel injection and/or a liquid fuel pump (not shown) that is pressurizing conduit 70. The negative pressure bias can cause malfunctioning of the concentric needle fuel injectors and leakage of gaseous fuel into the liquid fuel return line within the injectors.

To prevent malfunctioning injectors and leakage, gaseous fuel is vented from apparatus 50 through valve 90 to maintain the positive pressure bias. Vented gaseous fuel is captured and stored in accumulator 100 and reintroduced into conduit 60 at a later time. As engine 30 consumes gaseous fuel, the gaseous fuel pressure decreases in conduit 60. When the gaseous fuel pressure in conduit 60 is below the pressure in accumulator 100, check valve 110 opens allowing gaseous fuel to flow from the accumulator into conduit 60. Although check valve 110 is shown with a spring bias to set a pressure differential between the pressure in conduit 60 and that in accumulator 100 required to open the check valve, this is not a requirement, and the check valve can be in the open state at least when the accumulator pressure is greater than the conduit pressure. In high pressure direct injection applications, when gaseous fuel in conduit 60 is introduced into engine cylinders late in the compression cycle and burned in a diffusion combustion mode, by returning vented gaseous fuel to conduit 60 it can also be introduced later in the compression cycle and burned in diffusion combustion mode, which has the advantage of producing less emissions compared to venting to atmosphere and fumigating the gaseous fuel through the intake manifold.

Figure 2:
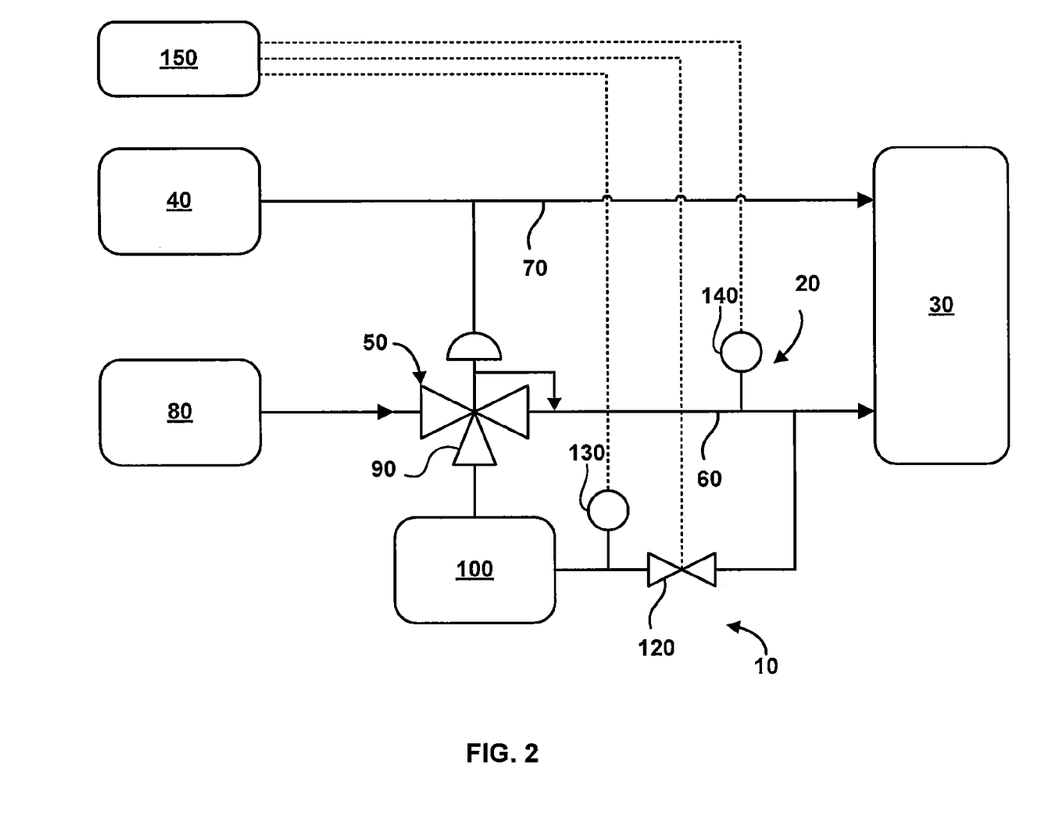
FIG. 2 is a schematic view of the vent handling apparatus of FIG. 1 illustrating an alternative valve arrangement.

With reference to FIG. 2, solenoid valve 120 can be employed instead of check valve 110 seen in FIG. 1. Pressure sensors 130 and 140 send signals representative of gaseous fuel pressure in accumulator 100 and gaseous fuel pressure in conduit 60 respectively to electronic controller 150, which activates solenoid valve 120 selectively when the accumulator pressure is greater than the conduit pressure.

Figure 3:
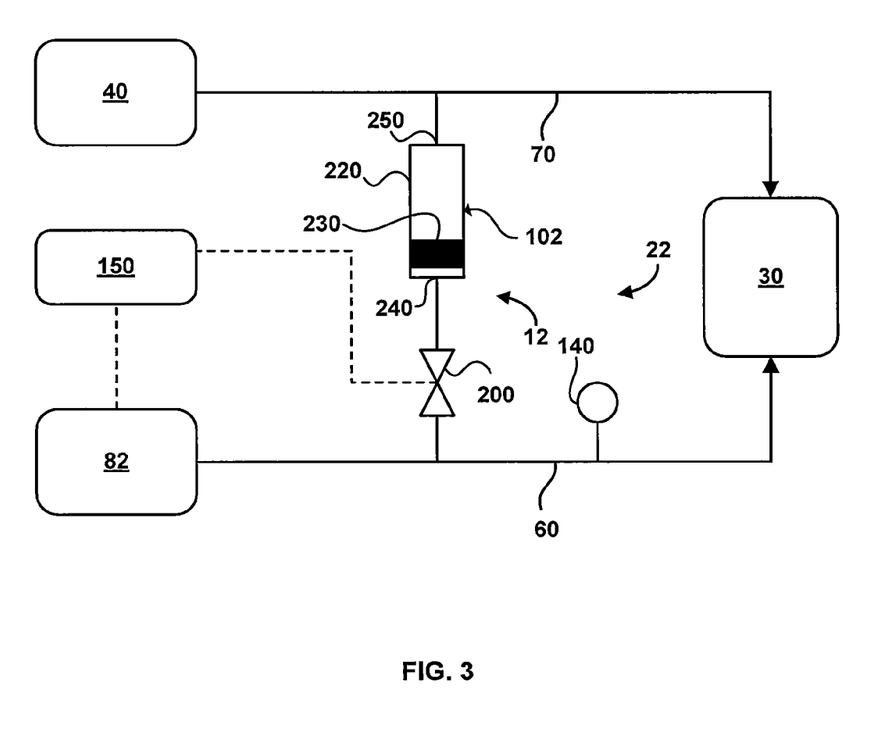
FIG. 3 is a schematic view of a vent handling apparatus for a gaseous fuel system of an internal combustion engine fuelled with a gaseous fuel and a liquid fuel according to a second embodiment.

Referring now to FIG. 3, vent handling apparatus 12 is illustrated according to a second embodiment that is similar to the first embodiment and like parts in this and all other embodiments have like reference numerals and may not be discussed in detail, if at all. Apparatus 12 reduces, and preferably prevents, leakage of gaseous fuel to atmosphere through fuel injectors (not shown) when engine 30 shuts down by purposely venting gaseous fuel to an accumulator. Gaseous fuel can leak past injection valves or through liquid fuel drains within the fuel injector that become a leak path for gaseous fuel when fluid seals no longer function after liquid fuel pressure drops. When the engine shuts down liquid fuel pressure can be relieved in conduit 70 by opening a liquid fuel drain valve (not shown) such that liquid fuel in conduit 70 returns through a drain to a liquid fuel tank in liquid fuel supply 40. Electronic controller 150 closes a gas shut-off valve (not shown) in gaseous fuel supply 82 to isolate the gaseous fuel supply from conduit 60, and opens valve 200 such that gaseous fuel in conduit 60 vents (expands) into accumulator 102. Accumulator 102 comprises cylinder 220 and piston 230 that is reciprocable within the cylinder. Cylinder 220 comprises gaseous fuel port 240 and liquid fuel port 250 on opposite sides of piston 230 that are fluidly connected with valve 200 and conduit 70 respectively. Piston 230 can be sealed with respect to the interior surface of cylinder 220, for example by annular seals, or a bellows can be connected between one side of the piston and the cylinder either near port 240 or port 250. As gaseous fuel expands into cylinder 220 the piston moves away from port 240 towards port 250, since gaseous fuel pressure is greater than liquid fuel pressure in conduit 70 after liquid fuel pressure is relieved to the drain after engine shut down. When gaseous fuel expansion into accumulator 102 is completed electronic controller 150 can close valve 200 to contain the fuel therein. There are a number of ways to determine when expansion has completed, but the simplest way is to wait for a predetermined amount of time before closing the valve, or by monitoring pressure signals from pressure sensor 140 to detect when the pressure stops decreasing. Any remaining gaseous fuel in conduit 60 after valve 200 has been closed can be purposively vented to atmosphere in a controlled manner to reduce the likelihood of the gaseous fuel venting in an uncontrolled manner past a hot surface. In other embodiments a valve can be employed between conduit 70 and port 250 of the cylinder that can be closed after shut down to reduce any leakage of gaseous fuel that is captured in the accumulator. During operation the pressure differential across the seals employed to seal piston 230 with the cylinder is relatively small and leakage across the piston will not significantly occur. Accumulator 102 can be sized relative to the volume in both conduit 60 and the fuel injectors to reduce gaseous fuel pressure in the conduit to a predetermined level based on the maximum gaseous fuel pressure possible in the conduit. Gaseous fuel supply 82 is similar to supply 80 in FIG. 1, and includes pressure regulating apparatus 50.

Gaseous fuel in accumulator 102 can be returned to conduit 60 when engine 30 starts up again. As the engine starts up, liquid fuel pressure is increased to fuel injection pressure, and since port 250 is fluidly connected with conduit 70 the pressure on the liquid fuel side of piston 230 is exposed to this pressure causing the piston to compress the gaseous fuel captured on the opposite side of the piston. When electronic controller 150 opens valve 200, the liquid fuel pressure causes piston 230 to move towards port 240 thereby evacuating the gaseous fuel in accumulator 102 into conduit 60. As explained above, when engine 30 is operating, the pressure bias results in liquid fuel pressure in conduit 70 being greater than gaseous fuel pressure in conduit 60, allowing the gaseous fuel in accumulator 102 to be evacuated. Electronic controller 150 preferably closes valve 200 after accumulator 102 has been emptied of gaseous fuel, to reduce leakage of liquid fuel past piston 230 into conduit 60. However, valve 200 can be kept open until after the engine shuts down and the gaseous fuel is once again expanded into the accumulator. Piston 230 can be biased towards port 250, for example by a spring, such that as liquid fuel pressure drops during engine shut down, the piston can be moved by the spring towards port 250, instead of employing the potential energy in the pressurized gaseous fuel in conduit 60. By biasing the piston in this manner the amount of time it takes for gas to expand into accumulator 102 is reduced.

Figure 4:
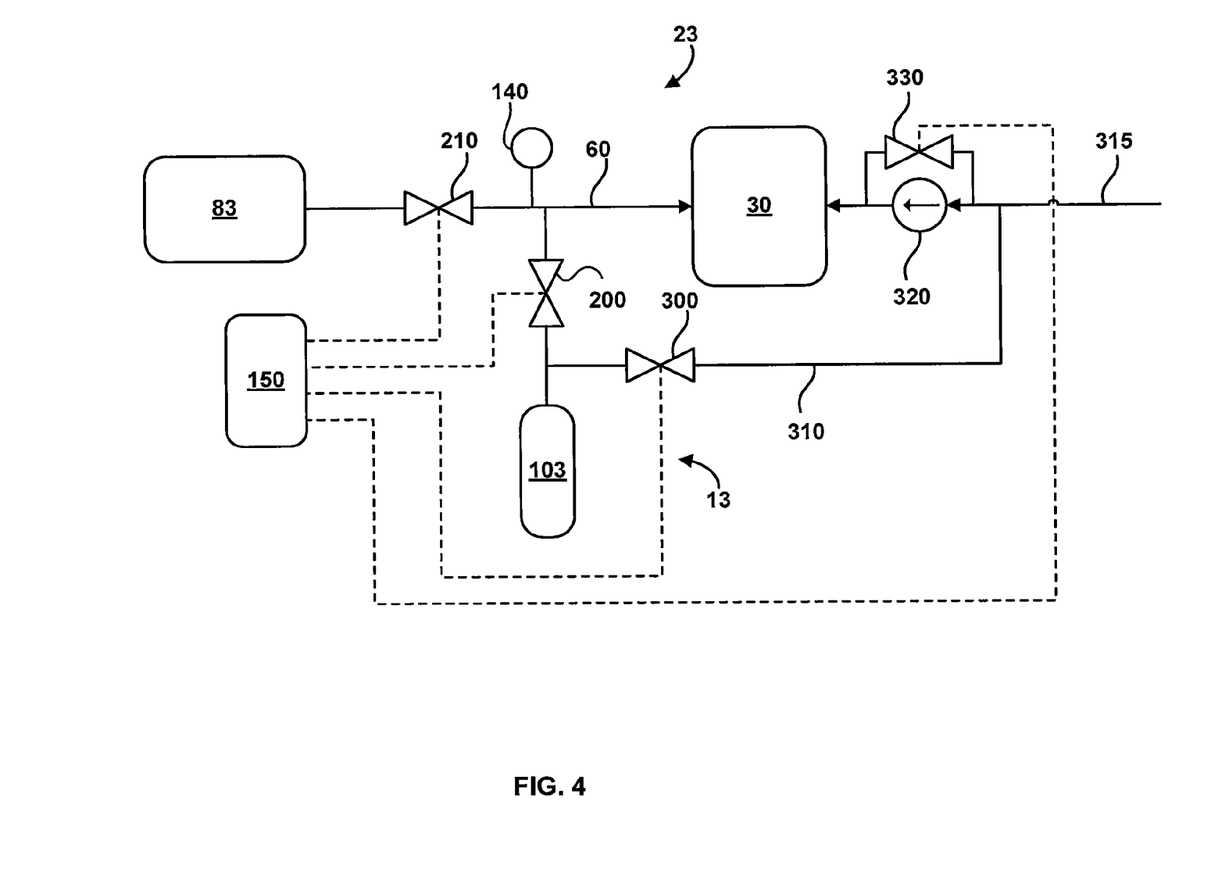
FIG. 4 is a schematic view of a vent handling apparatus for a gaseous fuel system of an internal combustion engine fuelled with a gaseous fuel according to a third embodiment.

Referring now to FIG. 4, vent handling apparatus 13 is illustrated according to a third embodiment. Apparatus 13 operates like apparatus 12 in FIG. 3 to reduce leakage of gaseous fuel from conduit 63 through fuel injectors (not shown) after engine 30 shuts down. However, the manner by which the gaseous fuel in accumulator 103 is reintroduced to the engine is different. Apparatus 13 can be employed with gaseous fuel systems that employ the concentric needle fuel injectors previously described, and can be used with engines that employ fuel injectors that introduce only a gaseous fuel, which typically only have a leak path across injection valves. Accumulator 103 is a container than can store a gas (that is, it does not have a piston like accumulator 102), similar to accumulator 100 in FIG. 1. Gaseous fuel supply 83 can be like gaseous fuel supplies 80 and 82 in FIGS. 1 and 3, which typically store gaseous fuel in a liquefied state, or it can be a gaseous fuel supply that stores gaseous fuel in a compressed state.

Returning to FIG. 4, when engine 30 is shutdown, electronic controller 150 opens valve 200 such that the gaseous fuel in conduit 60 and the fuel injectors expands into accumulator 103, and then after a predetermined amount of time closes the valve. Alternatively, electronic controller 150 can employ pressure sensor 140 to determine when to close valve 200 as a function of gaseous fuel pressure in conduit 60. When the fuel injectors only have a leak path across gaseous fuel injection valves, accumulator 103 can be sized relative to the volume in conduit 60 and in the fuel injectors such that after the gaseous fuel is expanded into the accumulator the pressure differential across injection valves is not enough to cause leakage. In a preferred embodiment, after gaseous fuel has expanded into accumulator 103, gaseous fuel pressure in conduit 60 is approximately equal to atmospheric pressure such that there is no pressure differential across the injection valves and at any other sealing junction in gaseous fuel system 23.

Gaseous fuel in accumulator 103 can be burned in cylinders of engine 30 when the engine starts up again by selectively controlling valve 300 to permit gaseous fuel to be drawn in by the air induction system of the engine through conduit 310. Conduit 310 is fluidly connected with intake pipe 315 upstream of compressor 320 that is mechanically coupled to a turbine (not shown) driven by exhaust gases of the engine or directly by the crankshaft, or both. By introducing the gaseous fuel upstream of compressor 320 the gaseous fuel can be burned during high load operational modes of engine 30, when boost in the induction system is employed, where the likelihood of the gaseous fuel being burned in combustion chambers is substantially increased compared to low load operational modes, when boost in the induction system is typically not employed, and where the gaseous fuel introduced through the induction system has decreased likelihood of burning. In a preferred embodiment, the mixture of gaseous fuel and induction air formed upstream of compressor 310 is a non-ignitable lean mixture, that is below the lower flammability limit of the gaseous fuel employed. Valve 330 is a compressor by-pass valve, as would be known by those familiar with the technology, which allows operation in modes not requiring compressor 320, such as low load operational modes.

Figure 5:
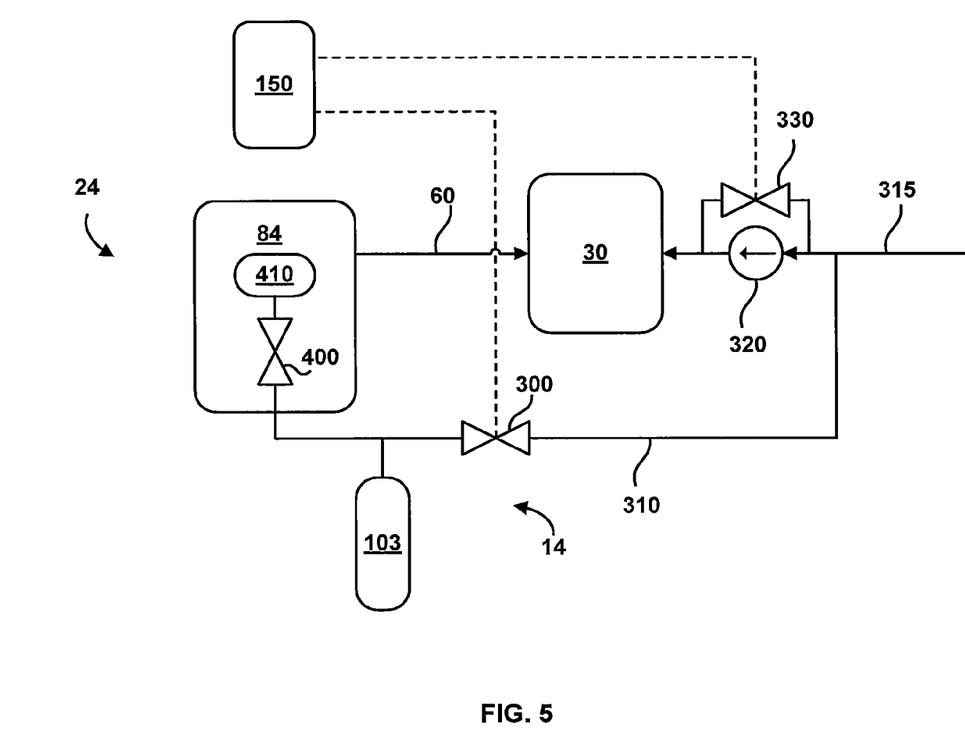
FIG. 5 is a schematic view of a vent handling apparatus for a gaseous fuel system of an internal combustion engine fuelled with a gaseous fuel according to a fourth embodiment.

Referring now to FIG. 5, vent handling apparatus 14 is illustrated according to a fourth embodiment. Valve 400 is a pressure relief valve for cryogenic storage vessel 410 in gaseous fuel supply 84. Liquefied gaseous fuel in vessel 410 boils as heat is unavoidably introduced into the vessel. As a consequence of boiling, the vapor pressure within vessel 410 increases. When vapor pressure within vessel 410 reaches a predetermined level, valve 400 automatically opens to vent gaseous fuel into accumulator 103 to maintain the vapor pressure below safety limits. Gaseous fuel in accumulator 103 can then be introduced into the air induction system of engine 30 as described in the embodiment of FIG. 4.

Figure 6:
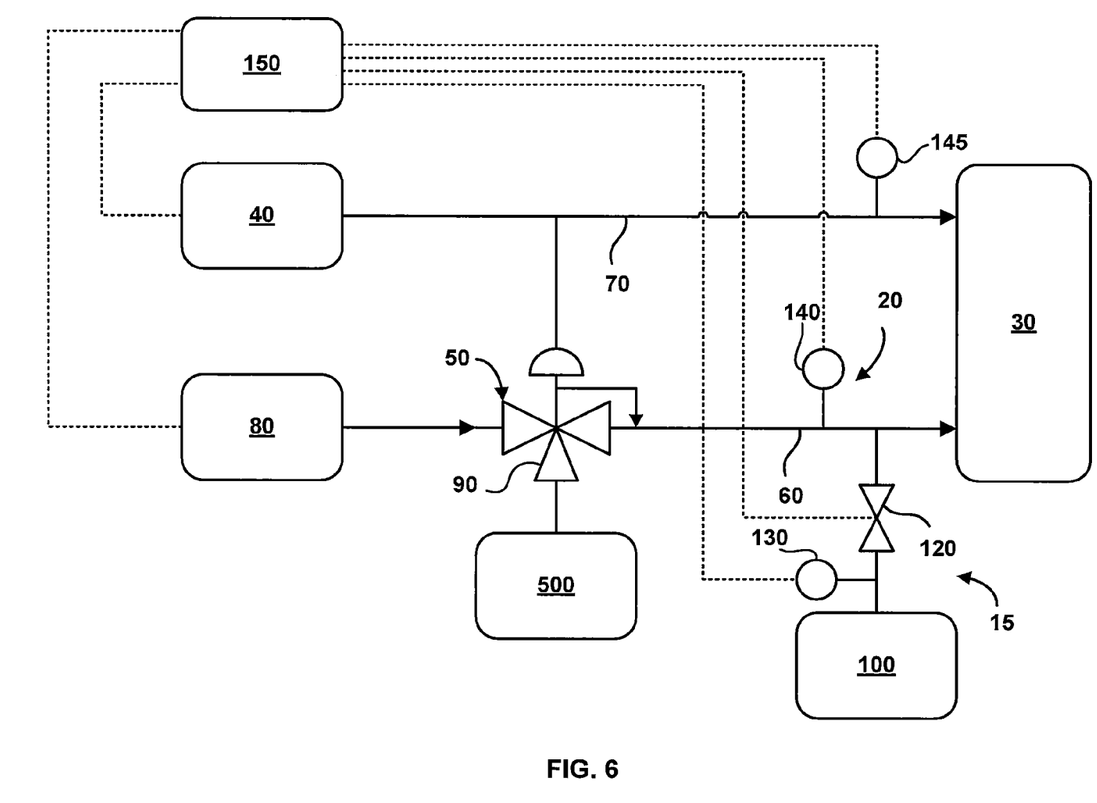
FIG. 6 is a schematic view of a vent handling apparatus for a gaseous fuel system of an internal combustion engine fuelled with a gaseous fuel according to a fifth embodiment.

Referring now to FIG. 6, vent handling apparatus 15 is illustrated according to a fifth embodiment. Apparatus 15 is similar to apparatus 10 in FIG. 2, but unlike apparatus 10, solenoid valve 120 is commanded by electronic controller 150 to open to capture gaseous fuel that is to be vented from conduit 60 in accumulator 100 first, before valve 90 is actuated to vent gaseous fuel to secondary vent handling apparatus 500. Pressure sensor 145 sends a signal representative of liquid fuel pressure in conduit 70 to electronic controller 150 such that the electronic controller knows both the gaseous fuel pressure in conduit 60 (by way of pressure sensor 140) and the liquid fuel pressure and can determine the pressure bias between these two fuels. Electronic controller 150 can be programed to actuate valve 120 based on the pressure bias and the gaseous fuel pressure in accumulator 100 before valve 90 is actuated by its pressure bias set-point. Electronic controller 150 also actuates valve 120 to reintroduce gaseous fuel in accumulator 100 into conduit 60 when gaseous fuel pressure in accumulator 100 is greater than gaseous fuel pressure in conduit 60. The gaseous fuel pressure set-point in conduit 60 is controllable by electronic controller 150 such that it can be manipulated to a desired level such that gaseous fuel in accumulator 100 can be returned to the rail. Electronic controller 150 is operatively connected with liquid fuel supply 40 such that it can command the liquid fuel supply to pressurize the liquid fuel in conduit 70 to a desired pressure, and this can involve increasing and decreasing actual liquid fuel pressure in the conduit. When liquid fuel pressure is to be decreased in conduit 70, supply 40 does not add liquid fuel to conduit 70 as it is removed, for example by engine 30, thereby decreasing liquid fuel pressure. Gaseous fuel pressure is then automatically regulated by pressure regulating apparatus to the desired level to allow reintroduction of gaseous fuel from accumulator 100 to conduit 60.

It is contemplated there could be modes of operation where the pressure in accumulator 100 is too large to allow the instantaneous capture of gaseous fuel from conduit 60 such that valve 90 is automatically actuated. In this event, secondary vent handling apparatus 500 manages the life cycle of the vented gaseous fuel. Apparatus 500 can include a system that returns gaseous fuel to a gaseous fuel tank, such as in Canadian Patent No. 2,831,762, or it can simply vent the gaseous fuel to atmosphere, or a combination thereof. By decoupling valve 90 from accumulator 100, there is a secondary path in which gaseous fuel can be vented from conduit 60 and the likelihood of a negative pressure bias between the liquid and gaseous fuels is reduced.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A vent handling apparatus for a gaseous fuel system of an internal combustion engine comprising:
    an accumulator for storing gaseous fuel vented from a gaseous fuel communication passage or a gaseous fuel storage vessel;
    a first valve selectively enabling fluid communication between the accumulator and one of the gaseous fuel communication passage and the gaseous fuel storage vessel, the gaseous fuel communication passage delivering gaseous fuel to the internal combustion engine for combustion; and
    an apparatus for selectively returning the gaseous fuel from the accumulator to the internal combustion engine for combustion comprising at least one apparatus chosen from:
    (1) when the first valve enables fluid communication from the gaseous fuel communication passage to the accumulator when a predetermined condition is met, at least one of the first valve and a second valve enabling fluid communication from the accumulator to the gaseous fuel communication passage when gaseous fuel pressure in the gaseous fuel communication passage is less than gaseous fuel pressure in the accumulator by a predetermined margin;
    (2) a source of pressurized liquid fuel,
    wherein the accumulator comprises a cylinder and a piston reciprocating therein, the gaseous fuel communication passage fluidly connected with the cylinder through a first port on a first side of the piston and the source of pressurized liquid fuel fluidly connected with the cylinder through a second port on a second side of the piston,
    wherein the gaseous fuel in the gaseous fuel communication passage is vented to and stored in the accumulator and the pressurized liquid fuel acts on the piston to return the gaseous fuel in the accumulator to the gaseous fuel communication passage through the first valve; and
    (3) a third valve fluidly connecting the accumulator with an intake air passage for selectively enabling fluid communication from the accumulator to the intake air passage upstream of a compressor arranged along the air intake passage.

2. The apparatus of claim 1, further comprising a pressure regulating apparatus for regulating a pressure bias between a liquid fuel and the gaseous fuel, wherein the first valve opens when the pressure bias drops below a predetermined level.

3. The apparatus of claim 1, wherein the second valve is one of a check valve and a solenoid valve.

4. The apparatus of claim 3, wherein the check valve has a spring bias urging the check valve closed.

5. The apparatus of claim 1, wherein the first valve is one of a pressure driven valve and a solenoid valve.

6. The apparatus of claim 1, wherein the piston comprises a spring bias urging the piston towards the second port.

7. The apparatus of claim 1, further comprising an electronic controller operatively connected with the first valve and programmed to close the first valve after one of the following:
    a predetermined time period after engine shut down; and
    gaseous fuel pressure in the gaseous fuel communication passage drops below a predetermined level.

8. The apparatus of claim 7, wherein the electronic controller is further programmed to open the first valve after the internal combustion engine starts up again.

9. The apparatus of claim 7, wherein the electronic controller is operatively connected with the third valve and programmed to open the third valve after the internal combustion engine starts up again.

10. The apparatus of claim 9, wherein the third valve is opened when the internal combustion engine is operating with boost.

11. The apparatus of claim 1, further comprising an electronic controller operatively connected with the first valve and programmed to adjust the pressure of gaseous fuel in the gaseous fuel communication passage wherein gaseous fuel pressure in the gaseous fuel communication passage is less than gaseous fuel pressure in the accumulator.

12. The apparatus of claim 1, wherein the apparatus for selectively returning the gaseous fuel from the accumulator to the internal combustion engine for combustion comprises items (1) and (2).

13. The apparatus of claim 1, wherein the apparatus for selectively returning the gaseous fuel from the accumulator to the internal combustion engine for combustion comprises items (1) and (3).

14. The apparatus of claim 1, wherein the apparatus for selectively returning the gaseous fuel from the accumulator to the internal combustion engine for combustion comprises items (2) and (3).

15. A method of handling gaseous fuel vented from a gaseous fuel system for an internal combustion engine comprising:
    capturing the gaseous fuel vented from at least one of a gaseous fuel communication passage or a gaseous fuel storage vessel into an accumulator, the gaseous fuel communication passage delivering gaseous fuel to the internal combustion engine for combustion; and
    at least one step chosen from:
    (1) when the gaseous fuel is vented from the gaseous fuel communication passage, reintroducing the gaseous fuel from the accumulator into the gaseous fuel communication passage when gaseous fuel pressure in the gaseous fuel communication passage drops below gaseous fuel pressure in the accumulator;
    (2) reintroducing the gaseous fuel from the accumulator into the gaseous fuel communication passage by pressurizing the gaseous fuel with a pressurized liquid fuel; and
    (3) reintroducing the gaseous fuel from the accumulator into an air intake passage of the internal combustion engine upstream of a compressor arranged along the air intake passage.

16. The method of claim 15, further comprising regulating gaseous fuel pressure in the gaseous fuel communication passage based on liquid fuel pressure and venting gaseous fuel to the accumulator when a pressure bias between a liquid fuel and the gaseous fuel drops below a predetermined level.

17. The method of claim 15, wherein a non-ignitable gaseous fuel and air mixture is formed in the air intake passage.

18. The method of claim 17, wherein the gaseous fuel is introduced into the intake air passage during high load operation of the internal combustion engine.

19. The method of claim 17, further comprising reducing gaseous fuel pressure in the gaseous fuel communication passage below the pressure of captured gaseous fuel.

20. The apparatus of claim 1, wherein the predetermined condition is met when a pressure bias between a liquid fuel pressure and a gaseous fuel pressure drops below a predetermined level.

21. A vent handling apparatus for a gaseous fuel system of an internal combustion engine comprising:
   an accumulator for storing gaseous fuel vented from a gaseous fuel communication passage;
   a first valve selectively enabling fluid communication between the accumulator and the gaseous fuel communication passage, the gaseous fuel communication passage delivering gaseous fuel to the internal combustion engine for combustion; and
   an apparatus for selectively returning the gaseous fuel from the accumulator to the internal combustion engine for combustion comprising at least one apparatus chosen from:
   (1) when the first valve enables fluid communication from the gaseous fuel communication passage to the accumulator when a predetermined condition is met, at least one of the first valve and a second valve enabling fluid communication from the accumulator to the gaseous fuel communication passage when gaseous fuel pressure in the gaseous fuel communication passage is less than gaseous fuel pressure in the accumulator by a predetermined margin;
   (2) a source of pressurized liquid fuel,
   wherein the accumulator comprises a cylinder and a piston reciprocating therein, the gaseous fuel communication passage fluidly connected with the cylinder through a first port on a first side of the piston and the source of pressurized liquid fuel fluidly connected with the cylinder through a second port on a second side of the piston,
   wherein the gaseous fuel in the gaseous fuel communication passage is vented to and stored in the accumulator and the pressurized liquid fuel acts on the piston to return the gaseous fuel in the accumulator to the gaseous fuel communication passage through the first valve; and
   (3) a third valve fluidly connecting the accumulator with an intake air passag for selectively enabling fluid communication from the accumulator to the intake air passage upstream of a compressor arranged along the air intake passage.

22. A method of handling gaseous fuel vented from a gaseous fuel system for an internal combustion engine comprising:
capturing the gaseous fuel vented from a gaseous fuel communication passage into an accumulator, the gaseous fuel communication passage delivering gaseous fuel to the internal combustion engine for combustion; and
at least one step chosen from:
   (1) when the gaseous fuel is vented from the gaseous fuel communication passage, reintroducing the gaseous fuel from the accumulator into the gaseous fuel communication passage when gaseous fuel pressure in the gaseous fuel communication passage drops below gaseous fuel pressure in the accumulator;
   (2) reintroducing the gaseous fuel from the accumulator into the gaseous fuel communication passage by pressurizing the gaseous fuel with a pressurized liquid fuel; and
   (3) reintroducing the gaseous fuel from the accumulator into an air intake passage of the internal combustion engine upstream of a compressor arranged along the air intake passage.

\* \* \* \* \*

UNITED STATES PATENT AND TRADEMARK OFFICE
CERTIFICATE OF CORRECTION

PATENT NO. : 10,598,133 B2
APPLICATION NO. : 15/521244
DATED : March 24, 2020
INVENTOR(S) : Kevin Kwame Oversby It is certified that error appears in the above-identified patent and that said Letters Patent is hereby corrected as shown below:

In the Claims

<u>Column 12, Line 16:</u>
"an intake air passag selectively enabling fluid" should read, --an intake air passage for selectively enabling fluid--.

Signed and Sealed this
First Day of September, 2020

Andrei Iancu
*Director of the United States Patent and Trademark Office*